March 23, 1948.    P. SENARD    2,438,460
SAW BLADE PLANISHING MACHINE
Filed Aug. 16, 1946    6 Sheets-Sheet 1

INVENTOR
PIERRE SENARD
BY
Robert E. Burns
ATTORNEY

March 23, 1948.    P. SENARD    2,438,460
SAW BLADE PLANISHING MACHINE
Filed Aug. 16, 1946    6 Sheets-Sheet 2

INVENTOR
PIERRE SENARD
BY
Robert E Burns
ATTORNEY

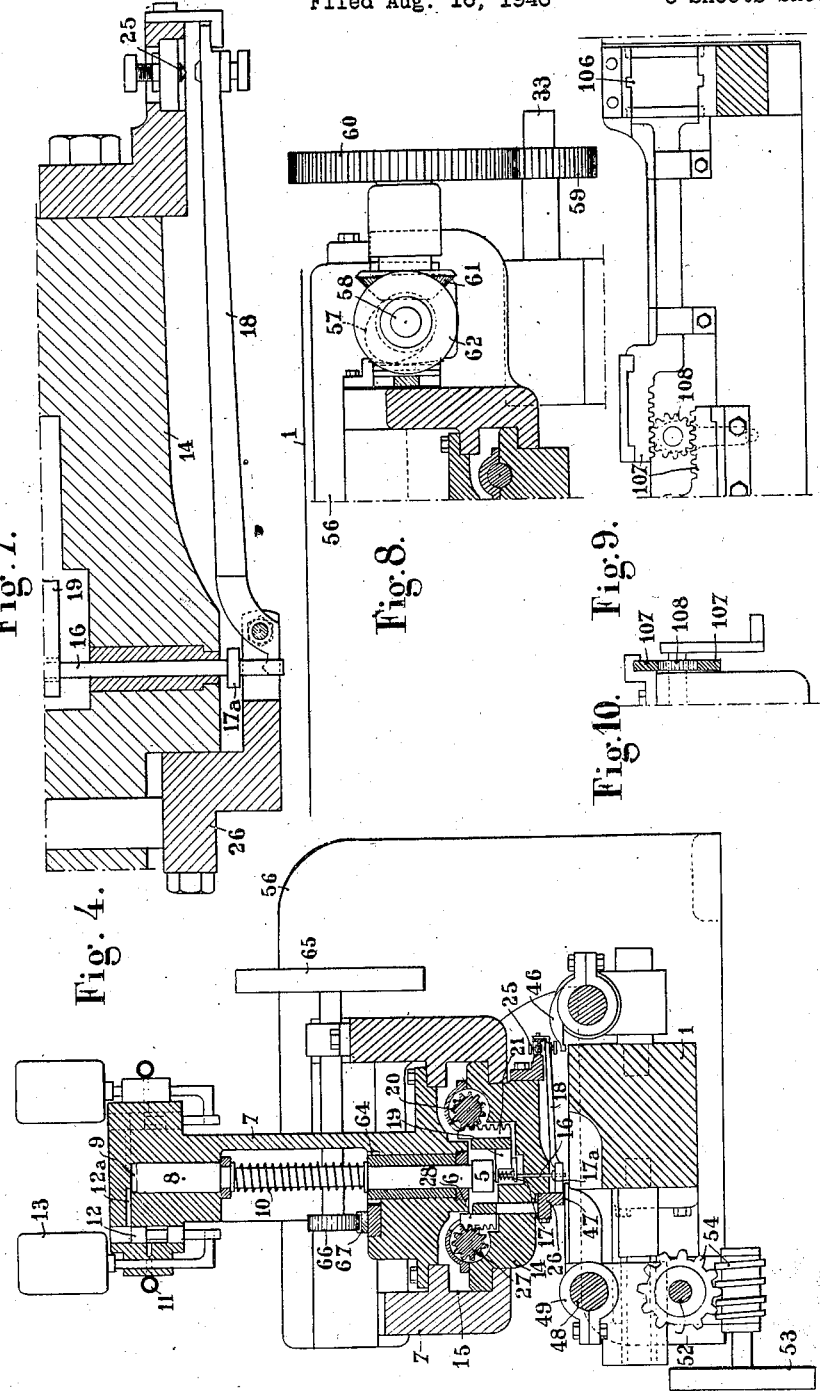

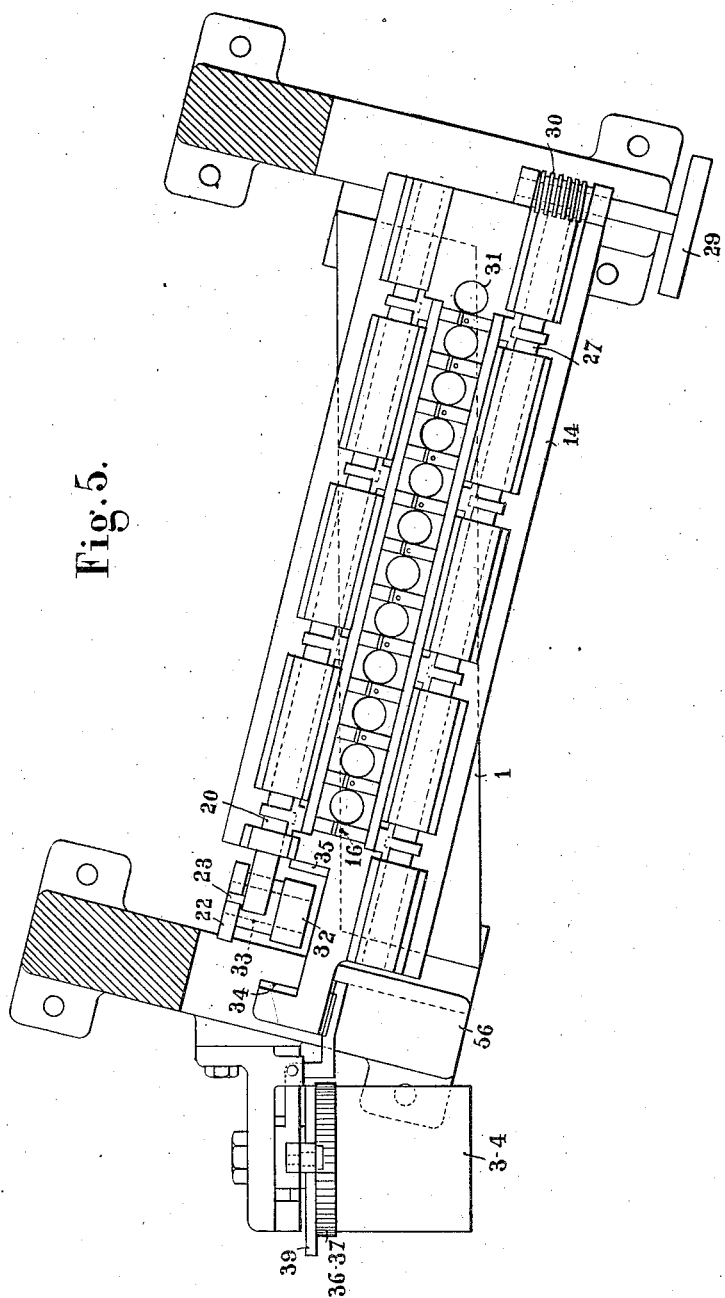

March 23, 1948. P. SENARD 2,438,460
SAW BLADE PLANISHING MACHINE
Filed Aug. 16, 1946 6 Sheets-Sheet 5
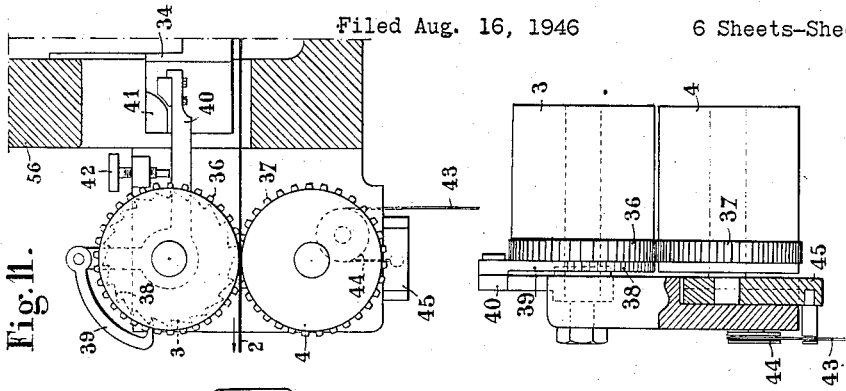
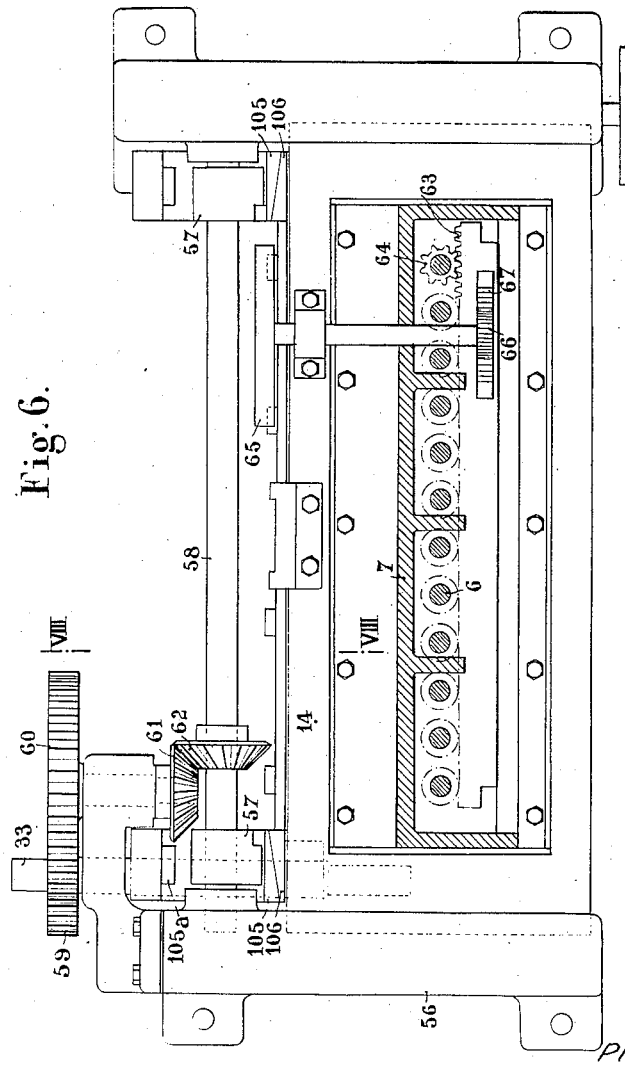
INVENTOR
PIERRE SENARD
BY
Robert E. Burns
ATTORNEY Patented Mar. 23, 1948

2,438,460

UNITED STATES PATENT OFFICE 2,438,460

SAW BLADE PLANISHING MACHINE

Pierre Senard, Bapeaume-les-Rouen, France

Application August 16, 1946, Serial No. 691,106
In France May 15, 1946

7 Claims. (Cl. 76—26)

The machine providing the subject-matter of this invention is designed for the planishing of band saw blades, that is for the removal of such swellings as are caused in operation by sawdust clots or wood splinters getting wedged between the blade and the rim of the pulleys by which the blade is driven.

The said machine is intended to make the planishing operation a completely mechanical and automatic one. With that end in view the blade to be planished is passed between the even surface of a block and a series of compressed air operated hammers each of which is provided with its own actuating means; the distribution of the compressed air to the hammer-actuating cylinders is controlled by electromagnets to be energized whenever a swelling in the blade becomes positioned in front of a feeler assigned to the corresponding hammer, so that a hammer located in front of any definite point of the blade will be actuated or will remain inoperative depending on whether a swelling is detected or not at the said point by the feeler.

The number of hammers and related feelers may vary according to the width of the blades to be planished; owing to the impossibility of arranging them in one single row at right angles to the direction of the blade, they may be arranged in one single or several oblique rows with respect to the said direction.

An embodiment of a machine of the kind thus outlined in which the hammers and the feelers are all aligned in one vertical plane above a horizontal block is shown by way of example in the appended drawing.

Figure 4 is a vertical sectional view taken on the axis of a hammer, the related feeler being displaced sidewise into coincidence with the axis of the said hammer.

Figure 5 is a plan view of the carriage, the hammers and the mounting of the same being removed.

Figure 6 is a horizontal sectional view taken on line VI—VI in Fig. 1.

Figure 7 is an enlarged view illustrating the actuation of a switch by the related feeler.

Figure 8 is a fractional sectional view taken on line VIII—VIII in Fig. 5 showing the mechanism controlling the transversal displacement of the carriage.

Figure 9 is a fractional back elevational view illustrating a mechanism for adjusting the displacements of the carriage.

Figure 10 is side view corresponding to Fig. 9.

Figures 11 and 12 are elevational views of the saw blade travelling mechanism.

Figure 1:
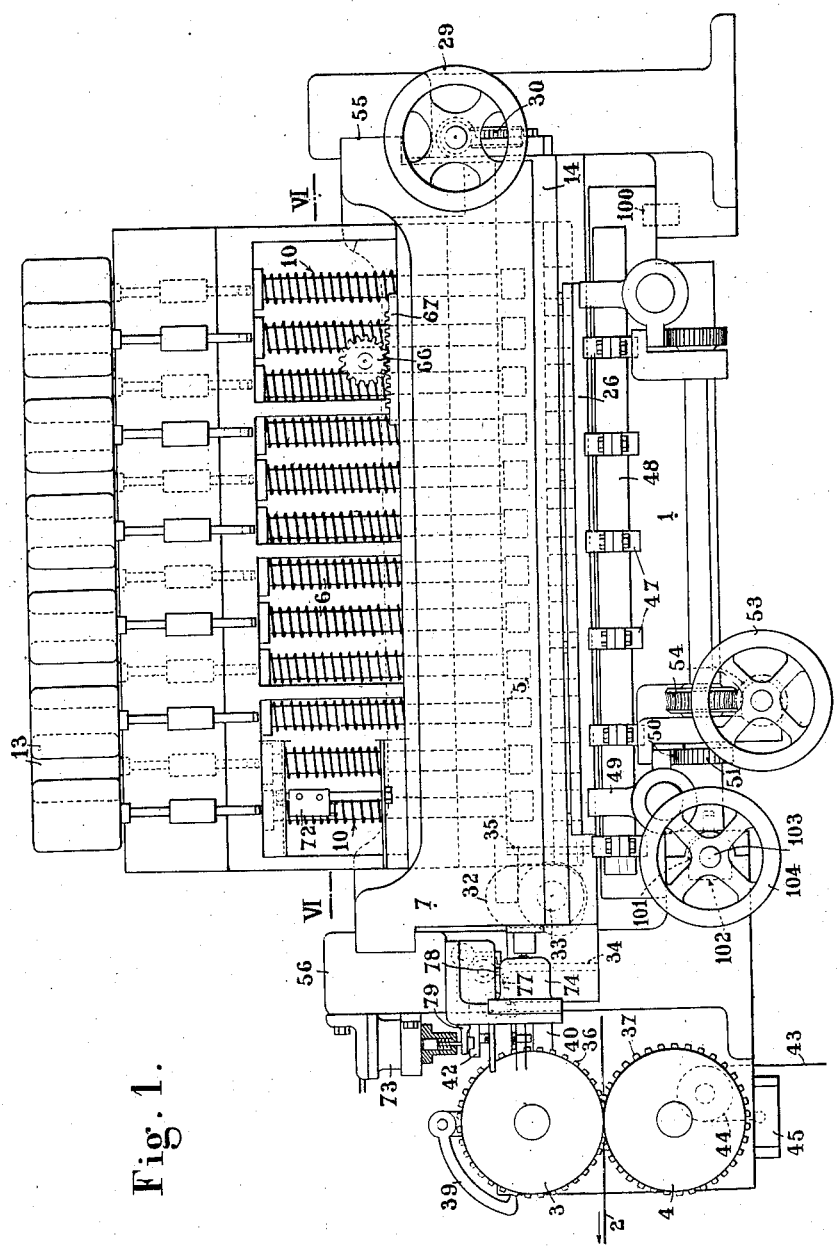
Figure 1 is a front elevational view.
Figure 3:
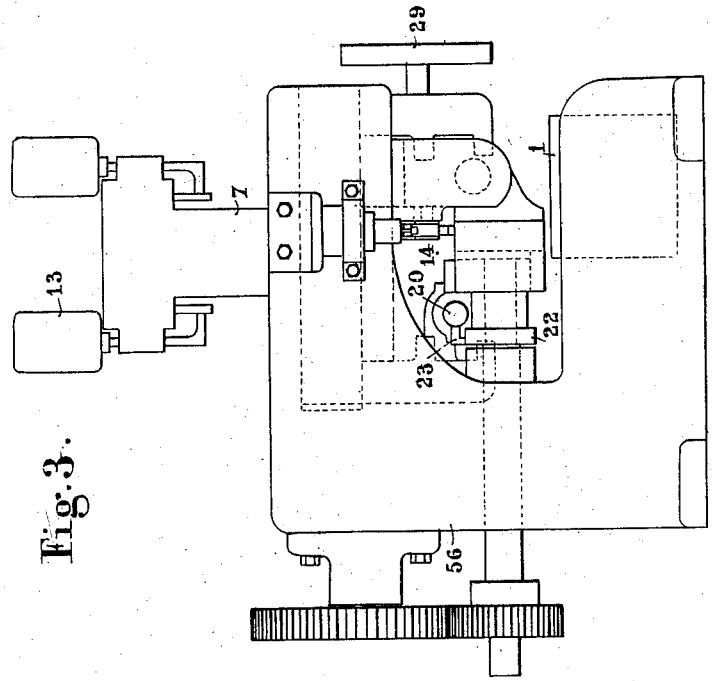
Figure 3 is an elevational view looking from the left side, the blade-travelling means being removed.

In the drawing, 1 designates the block on whose top face the saw blade 2 finds a bearing; said blade is travelled intermittently by rubber-lined rolls 3 and 4 between which same is pressed after it has passed below the set of hammers 5.

The shafts 6 of the latter are guided vertically in a frame 7 and each of them is formed at the top end thereof with a piston 8 slidably received in a cylinder 9 bored in the upper part of the frame 7. Each hammer is urged upwards by a spring 10 and is only driven downwards when a sufficient air pressure is exerted upon piston 8.

Said pressure air, which is delivered through a pipe 11, is admitted into each cylinder 9 by a valve 12 actuated by an electromagnet 13. As long as the latter is not energized the valve 12 remains in its lower position in which the cylinder communicates with the atmosphere through a vent 12a, so that the hammer is held in its lifted position by spring 10. Upon a suitable current being sent through the electromagnet 13 the valve is shifted to its upper position, whereby compressed air will flow into the cylinder and drive the piston 8 downwards, so that the hammer is struck upon the saw blade.

In order that each hammer shall become operative only when a swelling in the blade happens to be positioned therebelow, the machine comprises a series of feelers arranged in a support or carriage 14 mounted for sliding motion between guide bars 15 rigid with the frame 7. Each feeler is constituted by a needle 16 freely slidable in a vertical guideway drilled in carriage 14; secured on said needle 16 are stops 17 and 17a of which the former normally rests on a support 19 guided for vertical reciprocatory motion in carriage 14; the said reciprocatory motion is obtained by means of a shaft 20 formed with teeth that mesh with racks 21 rigid with the support 19 to which a rocking movement is imparted by a continuously rotating cam 22 that acts upon a finger 23 rigid with said shaft 20.

The vertical travel of the support 19 is so adjusted that when the latter is in its uppermost position the needles are lifted by an amount sufficient to allow the swellings in the blade 2 to pass freely below the needle points, whereas in the lowermost position of support 19 the needles can rest freely upon the even portions of the blade (Fig. 13), or even upon the block if no blade is present.

On the other hand, the stop 17a secured on the lower end of each needle is adapted to rock a switch lever 18 designed to make and break the circuit for an electromagnet acting as a relay; the latter controls the energizing of electromagnet 13 corresponding with the hammer associated with the needle considered as will be explained hereinafter.

Figure 13:
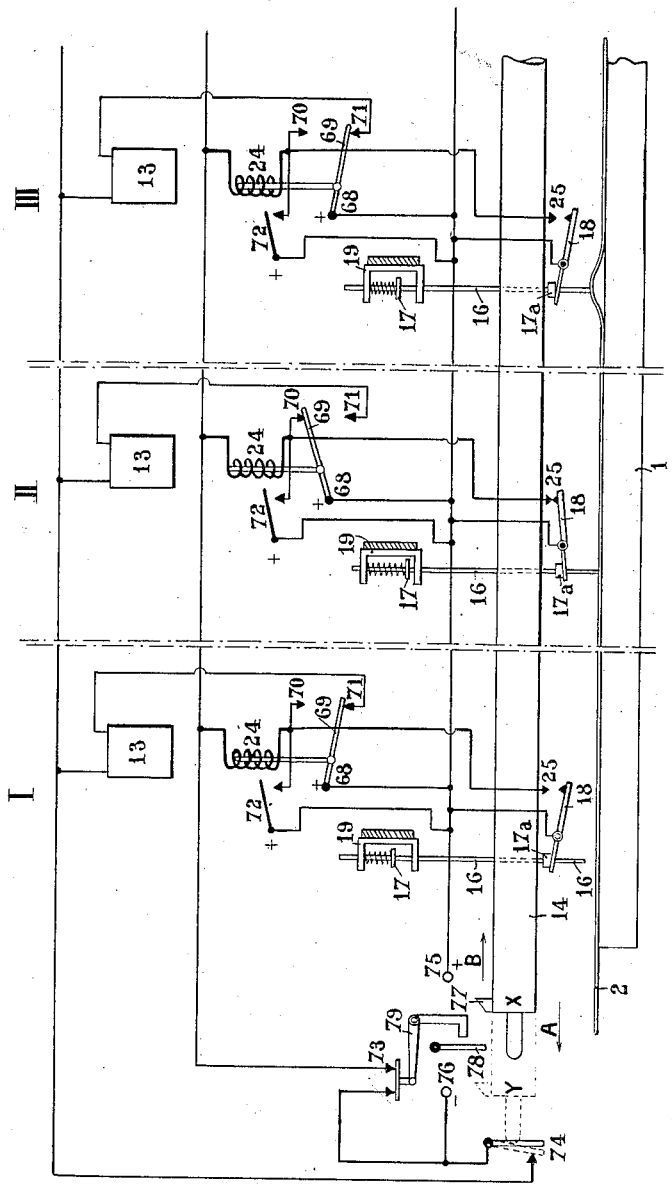
Figure 13 is a wiring diagram.

For that purpose the switch lever 18 cooperates with an adjustable contact stud 25 whilst its fulcrum pin is mounted on a support 26 whose vertical position can be adjusted in dependency on the thickness of the blade so that studs 18, 25 shall only come into contact when the needle 16 in its descending stroke comes into engagement with the even portions of the blade (position II in Fig. 13), whereas said studs will remain out of contact whenever the corresponding needle encounters a swelling of greater or less height (position III in Fig. 13). Said support 26 is adjusted vertically by means of a shaft 27 provided with teeth that mesh with racks 28 rigid with support 26 and actuated when necessary by means of a hand wheel 29 and a worm-gear coupling 30.

Figure 2:
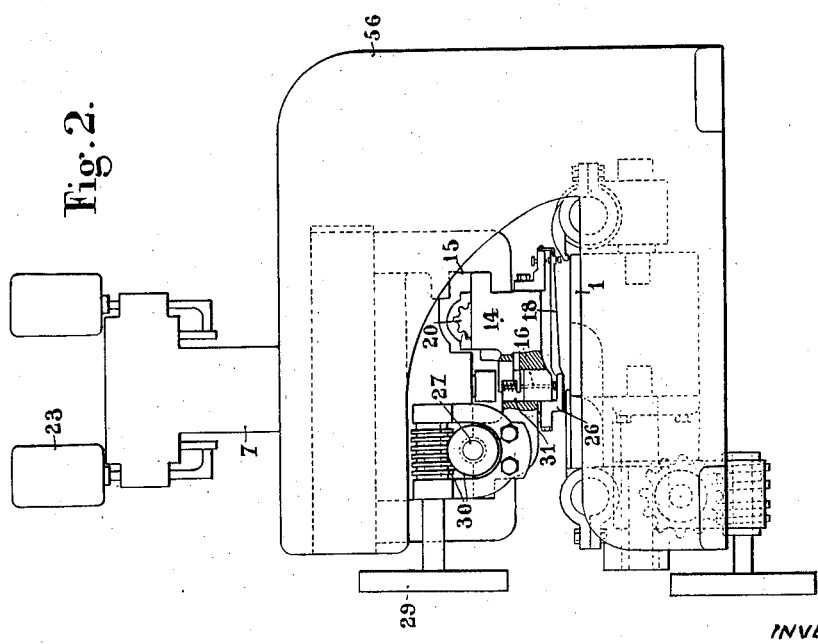
Figure 2 is an elevational view looking from the right side, parts being shown in section taken on the axis of a hammer.

In the embodiment illustrated the aligned hammers are uniformly spaced as well as the needles or feelers 16 by, say, 46 mm. from one axis to the next one. Provided in carriage 14 are a series of apertures 31 (Fig. 2) spaced by the same amount and through which the hammers can freely project when said apertures are positioned below the latter, that is, whenever the carriage reaches the end of its stroke forwards (indicated by arrow A). The stroke is about 23 mm., so that at the end of the return stroke (Fig. 4) the needle 16 which formerly were positioned plumb below the intervals between the hammers will now be positioned exactly below the latter.

The carriage is reciprocated by a cam 32 keyed on a shaft 33 and adapted to act alternatingly upon either of a pair of stops 34, 35 rigid with the carriage. Said shaft 33 which also carries the aforesaid cam 22 is rotated by a motor (not shown).

The reciprocatory motion of the carriage 14 is used to rotate the rolls 3 and 4 intermittently in order to advance the blade 2 by about 5 to 20 mm. at every back stroke of the carriage. For that purpose said rolls are coupled together by teeth 36, 37 and one of them is provided with ratchet teeth 38 co-operating with a pawl 39 pivoted on a lever 40 whose one end is depressed against the action of a spring (not shown) by a stop 41 rigid with the carriage; at every back stroke of the latter (indicated by the arrow B) the pawl 39 will thus be swung backwards, which results in the rolls being rotated by the desired amount; 42 designates a screw serving to adjust the amplitude of movement of lever 40 and consequently the blade feed. The blade is pressed between rolls 3 and 4 by a counterweight attached to a cable 43 run over a pulley 44 and secured at its other end to a slide 45 in which the axle of roller 4 is mounted.

Some additional constructive arrangements will now be described before the operation of the machine as a whole is dealt with.

It is necessary that blades of various widths can be guided on block 1. Guide members 46 and 47 are mounted for that purpose at either side of the block, the former being fixed whilst the latter can be moved towards or away from the same as desired; said adjustable guide members 47 are secured on a bar 48 supported adjacent to the ends thereof in a pair of slides 49 movable at right angles to the longitudinal direction of block 1 and formed with racks 50 co-operating with a pair of pinions 51 keyed on a shaft 52; the latter can be rotated as desired by means of a handwheel 53 through the medium of a worm gear connection.

In fact, the guiding means just described can be modified without departing from the invention, for instance where the block 1, instead of retaining an invariable angular position with respect to the row of hammers and feelers, would have to be variously set about pivot 100 (Fig. 1) or in some other way in order that the whole row of hammers may be caused to act upon saws of various widths.

Such setting of the block may be obtained, e. g., by means of a nut 101 guided in a slot 102 in the frame and moved by the revolution of a screw 103 mounted on the said frame and rigid with an operating hand-wheel 104. The movable end of the block is connected with said nut 101 in such manner that same will partake of the movements of the latter.

Moreover, as shown, the machine is so arranged that the frame 7 can be displaced slightly together with its carriage 14 in a direction at right angles to that of the blade 2 with respect to the fixed block and alternatingly in one and the other direction after each operation of the hammers, whereby fewer hammers can be used and the machine is reduced in length.

For that purpose the frame 7 is mounted for sliding motion by guides 55 on a fixed frame 56 and is reciprocated by a few millimeters with the aid of cams 57 secured on a shaft 58 mounted on said fixed frame and coupled with shaft 33 by a set of spur wheels 59, 60 and a set of bevel wheels 61, 62 so that its speed will be reduced by one half with respect to that of shaft 33. Carriage 14 is thus reciprocated twice longitudinally whenever it is reciprocated once transversely. As a consequence, the hammers will impinge the blade successively on oblique parallel lines; the transversal stroke controlled by the cams 57 is so adjusted that the said oblique lines will be spaced equally by, say, 5 mm., which spacing after all can be varied according to the width of the blade.

The said adjustment is obtained by a slight displacement of stops 105 or 105a that are acted on by the cams 57, which displacement is obtained for instance by means of wedges 106 interposed between the stops 105 and the carriage 14 and moved longitudinally with the aid of racks 107 (Figs. 7, 9 and 10) and a driving pinion 108. This will allow accurately to adjust the transversal stroke of the carriage whenever a change is made in the set of the block with respect to the frame.

As a rule, the hammer heads have a circular outline; however, it may be desirable to use hammers with rectangular heads as shown in the drawing. In that case the hammer heads may advantageously be set in the longitudinal direction of the blade, or at right angles or obliquely thereto. For that purpose the machine shown comprises a rack 63 slidably mounted on the frame 7 and co-operating with pinions 64 rigid with the hammer stems, the height of said pinions being such that the latter will always remain in meshing engagement with rack 63 in spite of the vertical displacements of the hammers; said rack can be displaced as desired by means of a hand-wheel 65 adapted to act upon the same through the medium of a pinion 66 and a small rack 67.

The electrical equipment of the machine (Fig. 13), in addition to the contact members 18, 25 and the electromagnets 13 controlling the valves 12, comprises electromagnets 24 adapted to actuate switching members 69 that will come into contact alternatingly with studs 70, 71; switches 72 controlled by the hammers 14 in their vertical reciprocatory motion and a pair of main switches 73 and 74 actuated by the carriage in the longitudinal displacements of the same. The wiring being as illustrated in Fig. 13, the machine operates as follows:

As the carriage 14 completes its motion towards the right (position X) the main switch 73 is closed whereas 74 is open; at that moment the needles are completely lifted, and so are the hammers, switches 18 and 72 thus being open (position I, Fig. 13); on the other hand, the switch levers 69 are all dropped on studs 71, with the result that no current can flow through relays 24 or electromagnets 13.

Stops 19 are moved downwards by the action of shaft 20, which allows the needles 16 to fall freely.

Those needles which are not held up in their descending motion by swellings in the blade (position II, Fig. 13) will swing their respective switch arms 25 into contact with studs 25, whereby the corresponding circuits 75, 25, 18, 24, 73, 76 are closed; the said relays 24 will thus remain energized when subsequently the needles 16 are lifted by stops 19.

Conversely, where needles 16 encounter swellings (position III in Fig. 13), the related switch arms 18 will remain out of contact with studs 25, whereby the related relays 24, whose circuits are switched out at 25, 70 and 72 will leave the related switch levers 69 in their lowered positions.

By the revolution of cam 32 the carriage is then moved forwards (as shown by arrow A); as said carriage completes its stroke (position Y in Fig. 13) it will close the common switch 74; meanwhile, switch 73 has remained in its closed position. The closing of switch 74 will not cause any current to flow through those electromagnets 13 which correspond to needles 16 that did not happen to encounter a swelling, since the related relays 24 remained energized and the corresponding switch arms 69 now are in their lifted positions. However, a current will flow at that moment through all those electromagnets 13 which are connected with studs 71 with which switch levers 69 remained in engagement, that is, through those which correspond to places on the saw blade where swellings have been encountered by needles 16.

Due to the energizing of said electromagnets, compressed air is admitted into the related cylinders, whereby the corresponding hammers 5 are struck upon the swellings therebelow.

At a definite point in their downward stroke the said hammers will close the switches 72, whereby the related relays 24 are energized through 75, 72, 24, 73 and 76, so that the circuit for electromagnets 13 is broken at 71. The hammers which are returned immediately to their lifted position by the action of springs 10 will not be thrust once more upon the same swellings although switches 72 are open again due to the fact that the circuit through the relays is closed through 75, 68, 69, 70, 24, 73, 76.

By the action of cam 32 the carriage is displaced once more to the right; in the early stage of its stroke it will break the circuit through electromagnets 74, whereafter, as a lug 77 moves past an arm 78 for the actuation of lever 79 of switch 73, it will cut the flow of current through all the heretofore energized relays 24, so that as the carriage completes its travel (position Y) all the members are again in their initial positions, except the saw blade which has been moved forwards by a few millimeters due to the operation of members 3, 4 and 36—41.

Where, in disagreement with the arrangement illustrated, the feelers are located beyond the saw blade with respect to the hammers, they will be guided in holes drilled in the block, in which event light springs should urge them permanently into engagement with either the even or the depressed portions of the blade; the relays by which air is fed to the hammers may then be energized by means similar to those already described. Such an arrangement makes it unnecessary to provide for a reciprocatable carriage between the blade and the lifted hammers, whereby the machine is simplified both in construction and operation; on the other hand, contacts are not ensured so reliably unless suitable means are provided to keep the blade in permanent engagement with the block in spite of the pressure exerted by the feelers.

It is to be remarked that the block can be arranged vertically or obliquely instead of horizontally, provided the hammers and feelers are guided at right angles thereto.

Of course, the various arrangement illustrated for the actuation of the movable members of the machine can be replaced by some other mechanical or electrical means capable of operating in the same way without altering the essential features of the invention.

I claim:

1. A saw-blade planishing machine comprising a block for supporting the saw blade, means to move the blade forwards thereon intermittently in the longitudinal direction of the same, a set of feelers to be applied upon the blade, a set of compressed air hammers to be struck upon the blade at the points of the same which are engaged by the feelers and a set of electric control means to be energized or not depending on whether the related feelers are in engagement with swelled out or even portions of the blade, whereby pressure air is fed or not to the said compressed air hammers.

2. A saw-blade planishing machine as claimed in claim 1 wherein the feelers are arranged on the same side as the hammers with respect to the saw blade and can be displaced transversally, in combination with means to bring said feelers alternatingly into and out of alignment with said hammers, said means as well as the hammer driving means becoming operative during the periods in which the blade remains stationary on the block.

3. A saw-blade planishing machine as claimed in claim 1 comprising means to move the hammers and feelers as a whole crosswise to the direction of the blade after each impingement between consecutive longitudinal displacements of the blade, for the purpose of multiplying the number of points felt and struck on the blade with respect to the number of hammers and feelers.

4. A saw-blade planishing machine as claimed in claim 1 wherein the block comprises means to guide the blade in a direction parallel therewith and can itself be moved as desired laterally to allow the blade being set and advanced obliquely to a greater or less degree with respect to the sets of feelers and hammers.

5. A saw-blade planishing machine as claimed in claim 1 wherein the hammers have elongated heads and can be set angularly as desired with respect to the direction of the blade.

6. A saw-blade planishing machine as claimed in claim 1 comprising a switch in the circuit controlling the distribution of compressed air to each hammer, said switch being arranged to be opened by the hammer at an adjustable point of its stroke for the purpose of adjusting the force with which the hammer is struck upon the blade.

7. A saw-blade planishing machine as claimed in claim 1 wherein feelers are arranged opposite the hammers with respect to the blade in guideways provided in the block and are yieldingly held in permanent engagement with the blade.

PIERRE SENARD.

REFERENCES CITED

The following references are of record in the file of this patent:

UNITED STATES PATENTS

| Number | Name | Date |
|---|---|---|
| 533,714 | Leighton | Feb. 5, 1895 |